United States Patent
Brillon et al.

(10) Patent No.: US 6,998,967 B2
(45) Date of Patent: Feb. 14, 2006

(54) METHOD USED FOR RELOCKING A VEHICLE EQUIPPED WITH A HANDS-FREE ACCESS SYSTEM

(75) Inventors: Alain Brillon, Villeneuve Tolosane (FR); Jean-Michel Farinier, Lacroix-Falgarde (FR)

(73) Assignee: Siemens VDO Automotive, Toulouse Cedex (FR)

(*) Notice: Subject to any disclaimer, the term of this patent is extended or adjusted under 35 U.S.C. 154(b) by 121 days.

(21) Appl. No.: 10/766,844

(22) Filed: Jan. 30, 2004

(65) Prior Publication Data

US 2004/0183654 A1    Sep. 23, 2004

(30) Foreign Application Priority Data

Jan. 31, 2003   (FR) ................... 03 01095

(51) Int. Cl.
*B60R 25/10* (2006.01)

(52) U.S. Cl. .............. 340/426.13; 340/426.17; 340/539.23; 307/10.2; 307/10.5

(58) Field of Classification Search .......... 340/426.13, 340/426.17, 426.36, 426.1, 539.1, 539.23, 340/686.1, 5.2, 5.72; 307/10.2, 10.5
See application file for complete search history.

(56) References Cited

U.S. PATENT DOCUMENTS 5,682,135 A * 10/1997 Labonde ................ 340/426.17
5,844,470 A * 12/1998 Garnault et al. ........... 340/5.62
6,522,027 B1 * 2/2003 Morillon et al. ........... 307/10.3
6,700,475 B1 * 3/2004 Geber et al. .............. 340/5.61
6,714,119 B1 * 3/2004 Mindl et al. .............. 340/5.72
6,853,296 B1 * 2/2005 Chandebois ........... 340/426.28

FOREIGN PATENT DOCUMENTS

| DE | 199 39 550 | 3/2001 |
|---|---|---|
| EP | 0 523 602 | 1/1993 |
| FR | 2 700 625 | 7/1994 |
| FR | 2 749 607 | 12/1997 |
| FR | 2 816 346 | 5/2002 |

* cited by examiner

*Primary Examiner*—Toan N. Pham
(74) *Attorney, Agent, or Firm*—Young & Thompson

(57) ABSTRACT

This method is intended for a vehicle (2) equipped with a hands-free access system comprising a badge (4) and means of communication by electromagnetic signals between the vehicle (2) and the badge (4) making it possible to locate the badge (4) with respect to the vehicle. The hands-free access system makes it possible to operate a locking of the doors when the last door of the vehicle (2) is closed and when the badge (4) exits a first zone (Z1) delimited around the vehicle.

A second zone (Z2), more extensive than the first zone (Z1), is delimited around the vehicle. A relocking is commanded when, after a locking of the doors commanded by the hands-free system, a door is opened without action of the hands-free system and then closed again, uniquely insofar as a badge (4) is located within the second zone (Z2).

14 Claims, 3 Drawing Sheets

METHOD USED FOR RELOCKING A VEHICLE EQUIPPED WITH A HANDS-FREE ACCESS SYSTEM

FIELD OF THE INVENTION

The present invention relates to a method of relocking a vehicle equipped with a hands-free access system.

BACKGROUND OF THE INVENTION

For increasingly numerous vehicles, it is becoming possible to gain access to the passenger compartment and to the trunk of the vehicle without having to use a mechanical key or to send a signal to the vehicle by pressing a button. For this purpose it suffices to carry an electronic card, also called a "badge", which is compatible with the vehicle. An exchange of electromagnetic signals is carried out between the badge and the vehicle in order to allow the vehicle to identify the badge as being a badge authorizing access to the vehicle. In general, the vehicle transmits low-frequency (also called "LF" to represent "Low Frequency") signals at a frequency usually of the order of 125 kHz. The badge itself responds by generally transmitting signals of the radio frequency, or RF, type at a frequency of the order of 433 MHz. The vehicle of course comprises a receiver for the signals transmitted by the badge and, conversely, the badge also comprises a receiver for the signals transmitted by the vehicle.

New hands-free systems offer not only hands-free unlocking of the vehicle but also hands-free locking of the vehicle. The problems to be solved for managing the automatic locking of the vehicle are more complex than those for managing its unlocking.

It is known, for example, in order to achieve the automatic locking of a vehicle, to establish a bidirectional dialogue between the badge and the vehicle at radio frequency, that is to say using a frequency of the order of 433 MHz. In this case, the range of the signals is relatively large in both directions (of the order of between ten and several tens of meters). The hands-free access management system then detects the badge's exit from the RF transmission zone of the vehicle. When this exit is detected, the locking of the vehicle is commanded. This technology has disadvantages, on the one hand because the range of the RF signals is not well controlled and, on the other hand, because the zone thus defined around the vehicle is relatively large. In many cases, the driver does not perceive the locking of his vehicle, for example signaled by the lighting of the flashing indicators. He therefore leaves his vehicle without being certain of its locking.

In the contrary case in which a smaller zone is defined around the vehicle, for example by using LF technology, the driver perfectly perceives a return from his vehicle at the time of the locking. On the other hand, this locking can be too quick for a passenger getting out of the vehicle after the driver has left the LF transmission zone. In certain cases, for example if a passenger accompanies the driver of the vehicle, an automatic locking is desired. On the other hand, if for example the passenger gets out of the vehicle solely to gain access to its trunk, locking is not desired.

Whatever the extent of the zone defined around the vehicle may be, problems arise when the vehicle is locked by the hands-free system and consequently a door is opened and closed without using the hands-free function and in the absence of a badge in the zone defined around the vehicle.

The idea of the present invention is therefore to provide a specific method, hereafter called the relocking method, which manages such eventualities.

SUMMARY OF THE INVENTION

The objective of the present invention is thus to provide a locking method preventing lockings that are too quick but also making it possible not to leave the vehicle abandoned in an unlocked state.

For this purpose it proposes a method of relocking a vehicle equipped with a hands-free access system comprising a badge and means of communication by electromagnetic signals between the vehicle and the badge making it possible to locate the badge with respect to the vehicle, the hands-free access system making it possible to operate a locking of the doors when the last door of the vehicle is closed and when the badge exits a first zone delimited around the vehicle.

According to the present invention, a second zone, more extensive than the first zone, is delimited around the vehicle and a relocking is commanded when, after a locking of the doors commanded by the hands-free system, a door is opened without action of the hands-free system and then closed again, uniquely insofar as a badge is located within the second zone.

The relocking is here carried out by means of the management of a double zone around the vehicle. It is necessary for the second zone to be more extensive than the first one. In this case it is considered that the limits of the second zone are more distant from the vehicle than those of the first zone. With regard to the definition of the second zone, it can be considered indifferently that the points of the first zone are part or are not part of the second zone. If the second zone is considered to exclude the points of the first zone, when a badge is located in the first zone, the locking method is implemented whereas if it is located in the second zone, the relocking method is implemented. If the second zone includes the first zone, the relocking method is implemented even if a badge is located in the first zone. The final result is therefore identical.

The method according to the invention makes it possible to ensure that the locking (or relocking) takes place only if a badge is present in the proximity of the vehicle.

In such a relocking method, the first zone advantageously corresponds to the zone around the vehicle in which the badge receives the signals transmitted by the vehicle. As for the second zone, this is advantageously defined as being all of the points in space around the vehicle from which a signal transmitted by the badge is received by the vehicle. In these conditions, the two zones around the vehicle can be defined with the means usually used in a hands-free system, namely low frequency antennas and a radio frequency transmitter of the associated badge.

In a relocking method according to the invention, it is possible, in order to locate the badge in the second zone, to provide for the badge to transmit a recurrent message over a predetermined time period after the last response given to a location interrogation transmitted by the vehicle. As a variant, in order to locate the badge in the second zone, the vehicle can transmit, after detection by the vehicle of the closing of the last door of the vehicle, a signal toward the badge containing a request asking the badge to transmit a recurrent message over a predetermined time period, the badge then being located in the second zone insofar as this message is received by the vehicle.

In order to locate the badge in the second zone, provision can also be made for the vehicle to transmit a signal of the same type as those transmitted by the badge and the badge is located in the second zone if it responds to the signal received by the vehicle.

The management of a double zone for the relocking can be applied in certain cases of locking. Thus, for example, the cases are considered in which a locking should have been carried out but an obstacle has prevented this locking. This could for example be the case where a door is not closed at the time the badge exits the first zone defined around the vehicle.

The present invention also relates to a method of locking a vehicle equipped with a hands-free access system comprising a badge and means of communication by electromagnetic signals between the vehicle and the badge making it possible to locate the badge with respect to the vehicle, the hands-free access system making it possible to operate a locking of the doors when the last door of the vehicle is shut and the badge exits a first zone delimited around the vehicle.

According to the present invention, in the case in which an obstacle prevents the locking of the doors of the vehicle when the badge exits the first zone, a second zone, more extensive than the first zone, is delimited around the vehicle, and a locking is commanded after the prevention stops, uniquely insofar as a badge is located in the second zone.

In order to use the means normally already available in a vehicle equipped with a hands-free system, the antennas of the vehicle for locating the badge in the first zone preferably transmit low frequency signals, at a frequency of the order of 125 kHz. Similarly, the signals transmitted by the badge are advantageously radio frequency signals, for example at a frequency of about 433 MHz.

BRIEF DESCRIPTION OF THE DRAWING

Details and advantages of the invention will emerge better from the following description, given with reference to the appended diagrammatic drawing wherein.

DETAILED DESCRIPTION OF THE INVENTION

Figure 1:
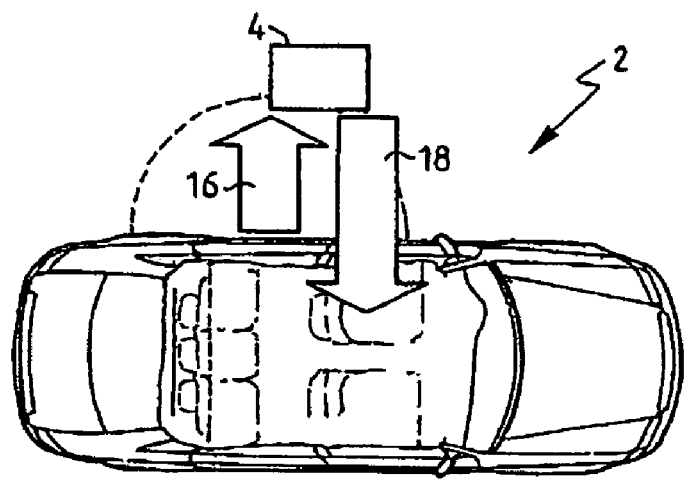
FIG. 1 shows a vehicle equipped with a hands-free system and diagrammatically illustrates the functioning of the latter.

FIG. 1 shows a vehicle 2 equipped with a hands-free system and with a corresponding badge 4. This badge allows the person carrying it to unlock the doors of the vehicle 2. It can also be used for starting the engine of the vehicle 2 simply by pressing a button placed on the dashboard. The hands-free access system for the present invention also comprises a third function, which is automatic locking on becoming distant from the vehicle 2.

Conventionally, for a vehicle equipped with a hands-free system, LF (Low Frequency) transmitting antennas are disposed inside the vehicle and others outside of the vehicle. The internal antennas 6 are distributed inside the passenger compartment of the vehicle. The external antennas 8 are for example integrated in the door handles of the vehicle 2. These antennas 6 and 8 transmit a signal at a frequency of 125 kHz and their range is of the order of one meter. This range corresponds to the sensitivity of an LF receiver disposed in the badge 4.

Figure 2:
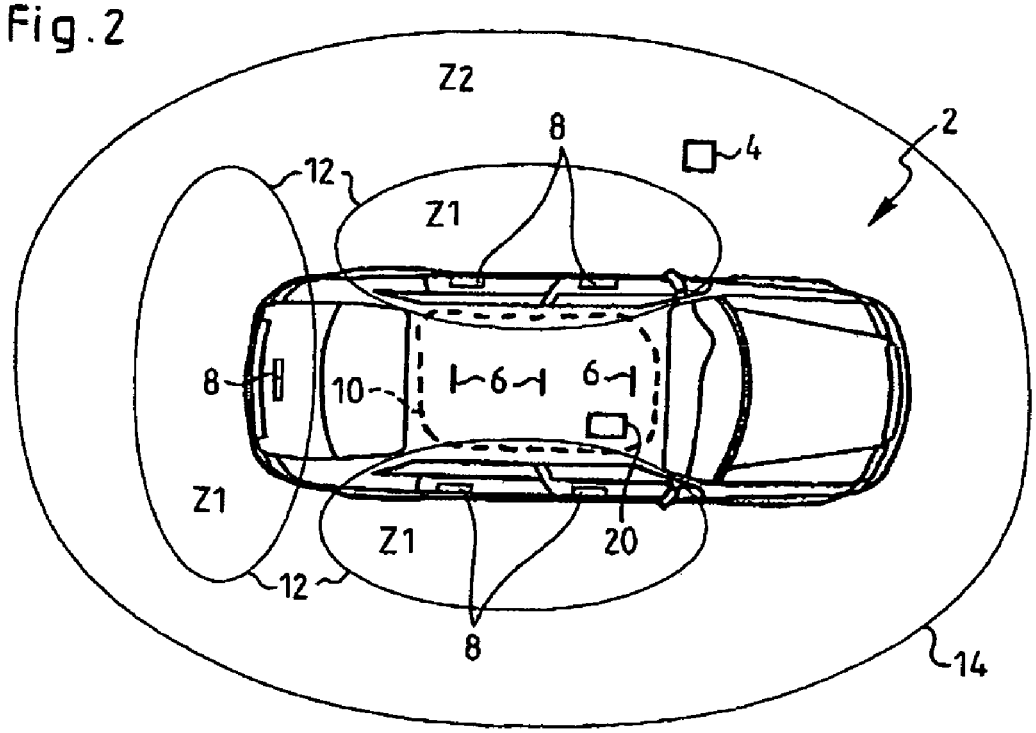
FIG. 2 is a diagrammatic illustration of a vehicle surrounded by two zones for the implementation of a method according to the invention, and FIGS. 3 and 4 each show a flowchart of an example of the method according to the invention.

In FIG. 2 the zones of reception of the signals transmitted by the LF antennas of the vehicle by the corresponding badge 4 are shown. The range of the internal antennas 6 is limited to the interior of the passenger compartment of the vehicle 2 and the range limit of these antennas is symbolized by a dotted line 10. The range of the external antennas 8 is symbolized by lines 12. In this way there is defined around the vehicle 2 a first zone which, in FIG. 2, is jointly formed by three "sub-zones", one on the left hand side of the vehicle, one on the right hand side and one at the rear of the vehicle.

The badge 4, in addition to its LF receiver, is equipped with an RF (Radio Frequency) transmitter transmitting signals at a frequency of the order of 433 MHz. The vehicle 2 comprises a receiver corresponding to the RF transmitter of the badge 4. The range of the signals transmitted by the latter is of the order of ten meters. In FIG. 2 there has been shown the zone limit 14 within which the badge 4 must be located so that the signals that it transmits can be received by the vehicle 2. In this way a second zone around the vehicle 2 is defined. FIG. 2 is only diagrammatic and the various contours are not shown to scale and do not necessarily correspond to the real contour shape.

The communication between the vehicle 2 and the badge 4 is represented diagrammatically in FIG. 1. An arrow 16 represents an LF signal in the upward direction, that is to say from the vehicle 2 toward the badge 4, whilst an arrow 18 represents an RF signal in the downward direction, that is to say from the badge 4 toward the vehicle 2. An exchange of signals such as represented by the arrows 16 and 18 makes it possible, in a known way that is not described in detail here, to identify the badge 4 as being a badge authorizing access to the vehicle and also to locate that badge. A management device 20 of the hands-free system is provided in the vehicle 2. It is connected to the LF antennas 6 and 8 and integrates, for example, an RF receiver.

The hands-free system makes it possible to lock the vehicle 2 automatically when the badge 4 becomes distant from that vehicle. In the method of locking the vehicle 2, the locking is commanded when the badge 4 exits the first zone (hereafter called Z1) delimited by the contours 12. It is of course necessary for the badge to remain outside of the vehicle otherwise, on entering the vehicle, the driver carrying the badge 4 would experience the doors being locked behind him since he is exiting the zone Z1.

The present invention therefore relates to a relocking method. It relates, for example, to the following case: the driver, having his badge with him, gets out of the vehicle and closes his door behind him. With all of the doors of the vehicle closed, the driver moves away from the vehicle 2 with the badge 4 in his pocket and exits the zone Z1. An automatic locking of the doors is then commanded by the management device 20. A passenger, not possessing a badge and remaining inside the vehicle 2, decides to get out of it. On getting out, he closes the door again. The present invention applies, for example, to the management of such a situation.

Figure 3:
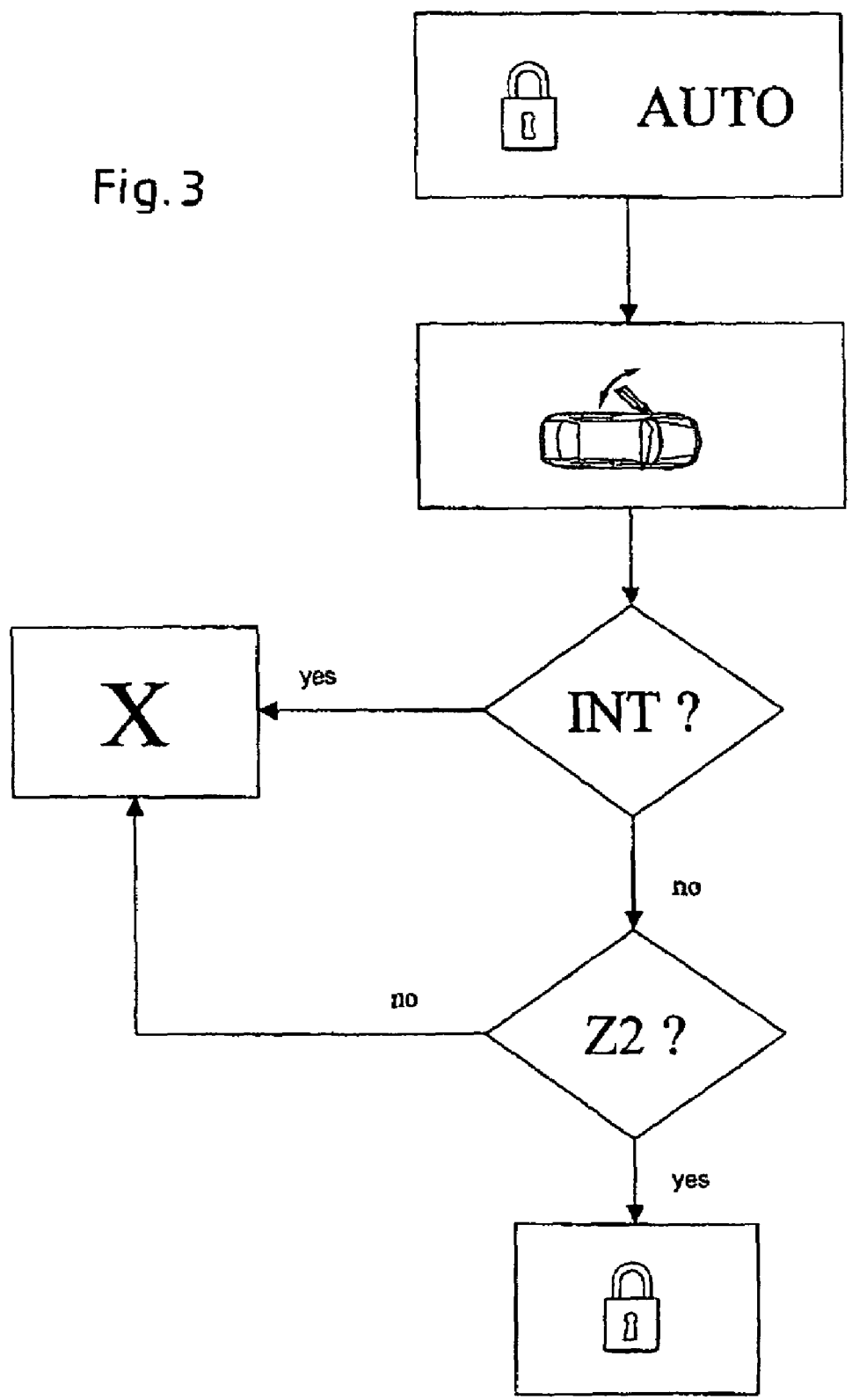

FIG. 3 shows a flowchart for a method according to the present invention. Previously, as described above, two distinct zones Z1 and Z2 delimited by the contours 12 and 14 are defined. The zone Z1 is the zone within which the badge 4 receives an LF signal transmitted by the external antennas 8. The zone Z2 is the zone within which the badge can be located for its RF signals to be received by the vehicle 2, whilst excluding from that zone the interior of the passenger compartment covered by the internal antennas 6 of the vehicle.

Firstly, it is considered that an automatic locking of the vehicle is carried out. It is therefore assumed that all of the doors of the vehicle are closed and that the carrier of a badge 4 moves away from the zone Z1 defined around the vehicle 2. The relocking method is then triggered when a door opens and closes again. The opening and closing of a single door is assumed in the continuation of the description. However, there can of course be two passengers getting out through two separate doors. The relocking method is therefore triggered at the time of closing of the last door.

After closing the last door of the vehicle 2, it is appropriate to locate the badge. The internal antennas 6 are therefore activated in order to determine if the badge is located inside the passenger compartment of the vehicle 2. If it is so, it is considered that the carrier of the badge has got back into the vehicle. There is therefore no reason to act and the door remains unlocked. This situation, which consists of not acting, is symbolized by a cross in the drawing.

If, on the contrary, the badge 4 is not detected inside the vehicle 2, the management device 20 carries out an analysis to determine if the badge 4 is located within the zone Z2. It is described below how this analysis can be carried out. The locking of the vehicle is then carried out if the badge 4, for which it has just been determined that it is not inside the vehicle 2, is located outside and within the zone Z2. If, on the contrary, the badge 4 is not located in the zone Z2, the management device 20 does not act. The door which has been opened remains unlocked whilst the doors that have not been opened since the last locking remain locked.

If no badge is present in the vicinity of the vehicle when the last door is closed again, that door is not locked. On the contrary, if several badges 4 are present, for example one badge inside the vehicle and another one in the pocket of a person getting out of the vehicle, several cases can be envisaged. The management device 20 can be programmed to prohibit any automatic locking when a badge is identified inside the vehicle. The case is then that in which it is considered that a key of the vehicle must not be locked inside that latter. An automatic locking can also be provided by the management device 20. This is, for example, the case in which it is considered that a passenger has a badge on him and that he remains inside the vehicle. Having a badge on him, he will be able to exit freely and then subsequently get in the vehicle again since he has an authorized badge. It is also possible to provide, in both cases, for the badge which is becoming distant from the vehicle to transmit a warning when the management device 20 has detected the distancing of the badge from the vehicle whilst another badge is still present inside of it. Such situations are managed by the method of locking the vehicle 2.

The location in the zone Z2 can be carried out in various ways. A first variant provides, for example, for equipping the vehicle with an RF transmitter. An RF request is then transmitted to which the badge 4 responds insofar as it is still within the zone Z2. A request can also be transmitted by the internal antennas 6 in order to ascertain that the badge 4 is not inside the passenger compartment.

In another variant, the location of the badge in the zone Z2 is carried out uniquely with the means normally used in a hands-free system. Provision is therefore made that each time the badge 4 receives a request from the external antennas 8, that is to say when it is within the zone Z1, it transmits RF signals over a predetermined time period and at a predefined frequency. As long as these signals are then received, it is known that the badge 4 is within the contour 14. If the management device 20 determines that the badge has exited the zone Z1, the badge is considered as being in the zone Z2 insofar as the signals that it transmits are still received by the RF receiver of the vehicle and insofar as it is not inside the passenger compartment (which is checked by the transmission of a request by the internal antennas 6). In order to conserve the battery power of the badge 4, it is possible to provide for the latter to transmit RF signals only after the reception of the last request transmitted by the external antennas 8. In fact, these requests are transmitted at regular intervals. The badge 4 therefore knows at which time it is considered to have received a request from the external antennas 8. If it does not receive this request, it then begins to transmit RF signals for its location by the vehicle 2.

As described above, the method of automatic relocking on becoming distant according to the invention manages two zones around the vehicle, one zone including the other.

The method described above makes it possible, in particular, to manage the case where two successive closings of a door are carried out. In the case where the driver exits his vehicle taking his badge with him and leaving a passenger inside the vehicle, a possible locking of the doors preventing the passenger from getting in the vehicle again after the driver has become distant from the vehicle is prevented. In the method according to the invention, the locking is carried out only insofar as a badge is still relatively close to the vehicle. The passenger then perceives the locking of the doors. If he does not desire this, he can still ask the badge carrier, who is in the proximity, to unlock the vehicle by giving him the badge for example. With certain methods of the prior art, the door would be locked even if the badge carrier was already a long distance from the vehicle. There would then be a risk of the passenger being outside of the vehicle with the vehicle locked and therefore being unable to get back into it. This is not desirable, especially in bad weather conditions (very cold, etc . . . ). With other methods of the prior art, the vehicle would not be locked after the second door closing. There was therefore a risk of the doors of the vehicle remaining unlocked whilst nobody was close to it.

The present invention makes it possible to solve these various problems.

The relocking method according to the present invention can also be applied in the case where a locking command has failed. It is then no longer strictly speaking a relocking but the same method according to the invention can be applied since the technical problem is similar.

Figure 4:
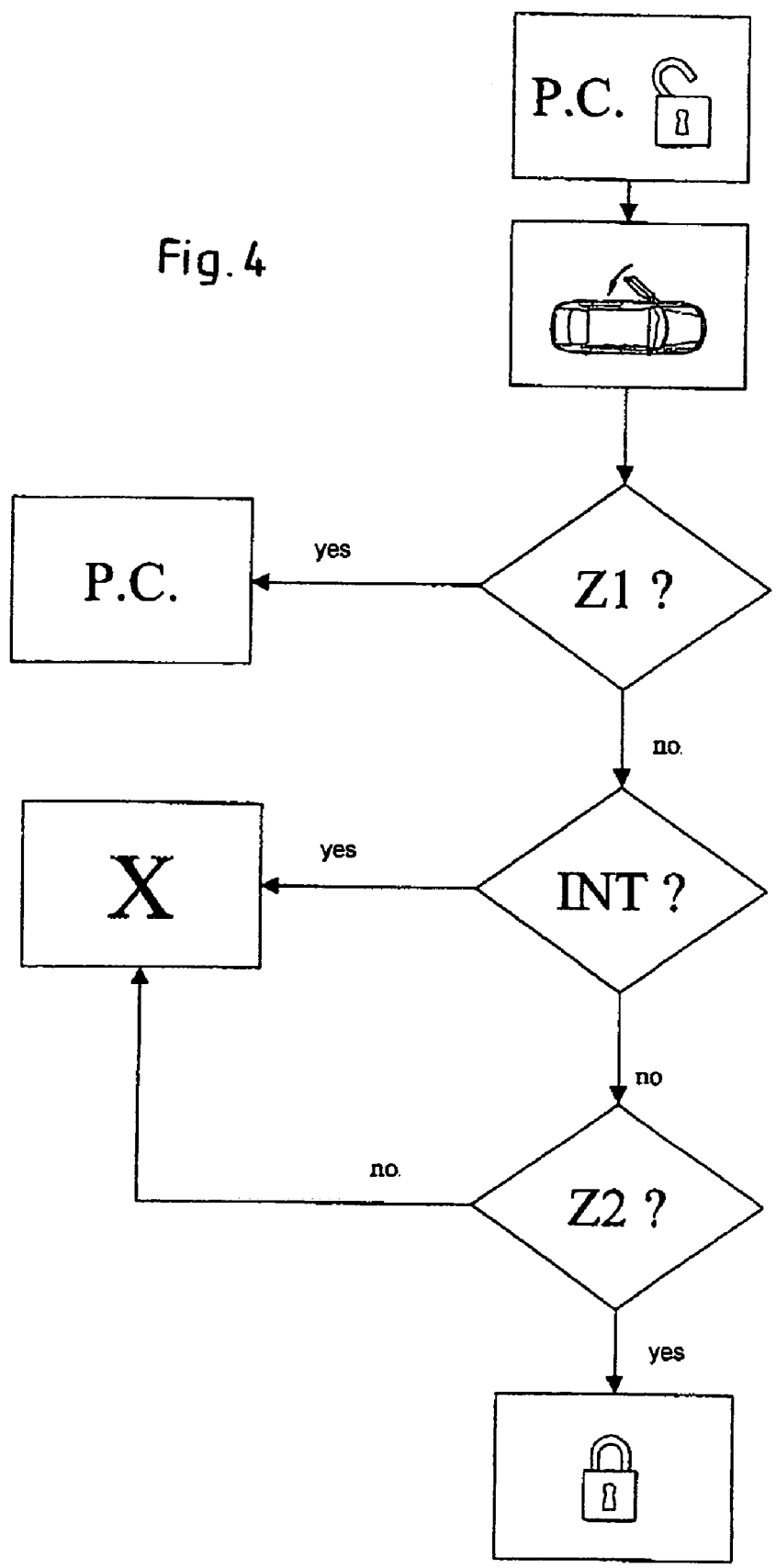

FIG. 4 thus shows a variant of the relocking method described above applied to a vehicle locking. It can be seen in this FIG. 4 that the steps at the bottom of the flowchart are taken from the flowchart shown in FIG. 3.

In the present case, it is assumed that the locking method P.C. is used but that for some reason it does not result in the locking of the vehicle 2. It can be assumed for example that a door of the vehicle 2 has been incorrectly shut. In this case, centralized locking systems (with or without a hands-free system) most often do not provide for locking the vehicle. In this way damaging the lock of the door that has remained open is avoided.

It is then assumed that the obstacle that has prevented the locking of the vehicle 2 is removed. In the flowchart shown in FIG. 4, this has been symbolized by the closing of a door.

When this obstacle has been removed, if a badge 4 is within the zone Z1, the conditions for a conventional locking are fulfilled. The locking method P.C. provided by the management device 20 is then applied.

In the opposite case, if no badge is detected inside the zone Z1, the relocking method according to the invention is implemented. The same steps as before are then used again. If the badge is inside the vehicle 2, the system does not act. If no badge is detected inside the vehicle, the management device searches for a badge in the zone Z2. If such a badge is detected, the locking of the doors is commanded whilst, in the opposite case, no action is undertaken.

The present invention is not limited to the methods and their variants described above as non-limiting examples. It also relates to all other variant embodiments within the capability of those skilled in the art within the scope of the following claims.

The described method is an advantageous method in particular because of the fact that it can be implemented with the conventional means found on board a vehicle equipped with a hands-free system. Thus the first zone is established around the vehicle by the external LF transmitting antennas normally used for locating the badge. The second zone is established by the RF transmitter generally integrated in the badge corresponding to the vehicle. Other means can be used for establishing these two zones. It is possible for example to envisage having two RF transmitters with different power ratings (and therefore different ranges) on board the vehicle. The important thing here is to establish two zones of different size around the vehicle and external to the vehicle.

There are several method for locating a badge in a vehicle or close to the vehicle. Any location method, and not only those described above, can of course be used here.

What is claimed is:

1. A method of relocking a vehicle (2) equipped with a hands-free access system comprising a badge (4) and means of communication by electromagnetic signals between the vehicle (2) and the badge (4) making it possible to locate the badge (4) with respect to the vehicle, the handsfree access system making it possible to operate a locking of the doors when the last door of the vehicle (2) is closed and when the badge (4) exits a first zone (Z1) delimited around the vehicle, characterized in that a second zone (Z2), more extensive than the first zone (Z1), is delimited around the vehicle and in that a relocking is commanded when, after a locking of the doors commanded by the hands-free system, a door is opened without action of the hands-free system and then closed again, uniquely insofar as a badge (4) is located within the second zone (Z2).

2. The relocking method as claimed in claim 1, characterized in that the first zone (Z1) corresponds to the zone around the vehicle in which the badge (4) receives the signals transmitted by the vehicle (2).

3. The relocking method as claimed in claim 2, characterized in that the second zone (Z2) is defined as being all of the points in space around the vehicle from which a signal transmitted by the badge (4) is received by the vehicle.

4. The relocking method as claimed in claim 2, characterized in that in order to locate the badge (4) in the second zone (Z2), the badge (4) transmits a recurrent message over a predetermined time period after the last response given to a location interrogation transmitted by the vehicle (2).

5. The relocking method as claimed in claim 2, characterized in that, in order to locate the badge (4) in the second zone (Z2), the vehicle (2) transmits, after detection by the vehicle of the closing of the last door of the vehicle (2), a signal toward the badge containing a request asking the badge (4) to transmit a recurrent message over a predetermined time period, the badge (4) then being located in the second zone (Z2) insofar as this message is received by the vehicle (2).

6. The relocking method as claimed in claim 2, characterized in that, in order to locate the badge in the second zone (Z2), the vehicle (2) transmits a signal of the same type as those transmitted by the badge (4) and in that the badge (4) is located in the second zone (Z2) if it responds to the signal received by the vehicle (2).

7. The relocking method as claimed in claim 1, characterized in that the second zone (Z2) is defined as being all of the points in space around the vehicle from which a signal transmitted by the badge (4) is received by the vehicle.

8. The relocking method as claimed in claim 7, characterized in that in order to locate the badge (4) in the second zone (Z2), the badge (4) transmits a recurrent message over a predetermined time period after the last response given to a location interrogation transmitted by the vehicle (2).

9. The relocking method as claimed in claim 7, characterized in that, in order to locate the badge (4) in the second zone (Z2), the vehicle (2) transmits, after detection by the vehicle of the closing of the last door of the vehicle (2), a signal toward the badge containing a request asking the badge (4) to transmit a recurrent message over a predetermined time period, the badge (4) then being located in the second zone (Z2) insofar as this message is received by the vehicle (2).

10. The relocking method as claimed in claim 7, characterized in that, in order to locate the badge in the second zone (Z2), the vehicle (2) transmits a signal of the same type as those transmitted by the badge (4) and in that the badge (4) is located in the second zone (Z2) if it responds to the signal received by the vehicle (2).

11. The relocking method as claimed in claim 1, characterized in that in order to locate the badge (4) in the second zone (Z2), the badge (4) transmits a recurrent message over a predetermined time period after the last response given to a location interrogation transmitted by the vehicle (2).

12. The relocking method as claimed in claim 1, characterized in that, in order to locate the badge (4) in the second zone (Z2), the vehicle (2) transmits, after detection by the vehicle of the closing of the last door of the vehicle (2), a signal toward the badge containing a request asking the badge (4) to transmit a recurrent message over a predetermined time period, the badge (4) then being located in the second zone (Z2) insofar as this message is received by the vehicle (2).

13. The relocking method as claimed in claim 1, characterized in that, in order to locate the badge in the second zone (Z2), the vehicle (2) transmits a signal of the same type as those transmitted by the badge (4) and in that the badge (4) is located in the second zone (Z2) if it responds to the signal received by the vehicle (2).

14. A method of locking a vehicle (2) equipped with a handsfree access system comprising a badge (4) and means of communication by electromagnetic signals between the vehicle (2) and the badge (4) making it possible to locate the badge (4) with respect to the vehicle (2), the hands-free access system making it possible to operate a locking of the doors when the last door of the vehicle is shut and the badge (4) exits a first zone (Z1) delimited around the vehicle (2), characterized in that in the case in which an obstacle prevents the locking of the doors of the vehicle (2) when the badge (4) exits the first zone (Z1), a second zone (Z2), more extensive than the first zone (Z1), is delimited around the vehicle (2), and in that a locking is commanded after the prevention stops, uniquely insofar as a badge (4) is located in the second zone (Z2).

* * * * *